United States Patent [19]

Morissette

[11] Patent Number: 4,639,043

[45] Date of Patent: Jan. 27, 1987

[54] SELF-DUMPING TRAILER

[76] Inventor: Richard W. Morissette, 3476 Gilham Rd., Eugene, Oreg. 97401

[21] Appl. No.: 675,358

[22] Filed: Nov. 27, 1984

[51] Int. Cl.⁴ .................................................. B60P 1/12
[52] U.S. Cl. ..................................... 298/5; 298/20 R; 298/22 B; 414/436; 414/485
[58] Field of Search ................... 298/5, 6, 15, 17 R, 298/19 R, 20 R, 22 B; 414/434, 435, 436, 483, 485

[56] References Cited

U.S. PATENT DOCUMENTS

| | | | |
|---|---|---|---|
| 2,144,599 | 1/1939 | Anthony | 298/22 B |
| 2,189,052 | 2/1940 | Anthony | 298/22 B |
| 2,491,417 | 12/1949 | Pflantz et al. | 298/5 |
| 3,193,329 | 7/1965 | Hribar | 298/8 |
| 3,232,666 | 2/1966 | Hutchinson | 298/14 |
| 4,021,074 | 5/1977 | Heiser | 298/22 |
| 4,054,301 | 10/1977 | Bond et al. | 280/400 |

FOREIGN PATENT DOCUMENTS

| | | | |
|---|---|---|---|
| 771506 | 7/1934 | France | 298/5 |
| 77338 | 8/1950 | Norway | 298/20 R |
| 267717 | 3/1927 | United Kingdom | 298/20 R |

Primary Examiner—Leslie J. Paperner
Attorney, Agent, or Firm—Lyon & Lyon

[57] ABSTRACT

A trailer designed to be towed behind a vehicle with a frame that is slidably attached to the trailer body. Inclined ramps are formed on the members of the frame such that when the frame slides rearward relative to the trailer, rollers on the underside of the trailer body cause the trailer to rotate about the axle. The slidable connection between the trailer and the draw bar yoke is slightly negatively inclined to insure that the mechanism will move freely and to enable the trailer to be returned to the horizontal position by merely applying a forward force on the frame. The invention also employs means to secure the trailer body to the frame when the trailer is in its normal horizontal position.

4 Claims, 4 Drawing Figures

SELF-DUMPING TRAILER

BACKGROUND OF THE INVENTION

The field of the invention relates to a trailer designed to be towed by a vehicle, and more particularly, to a trailer which will rotate about a horizontal axis thereby lowering the rear of the trailer to the ground.

A typical conventional trailer which may be made to tilt uses hydraulic power in order to lift one end of the trailer. Such trailers involve the use of hydraulic cylinders, mounting equipment for the cylinders, motors to operate the cylinders, and other additional mechanisms necessary to allow the components to function properly.

The problem with such trailers is that they are impractical for the average person in light of their expense and maintenance.

SUMMARY OF THE INVENTION

In order to provide an economical tilting trailer, the present invention provides a trailer which rotates about one axle such that one end of the trailer rests on the ground, without the use of expensive and complicated components. In order to maintain the position of the trailer, the trailer wheels are immobilized through the use of blocks or wheel brakes or the like. The tilting of the trailer body is accomplished by using a yoke which is slidably attached to the sides of the trailer frame. At least one inclined ramp formed on the slidable yoke acts to rotate the trailer about the rear axle when the yoke is slid rearward with respect to the trailer frame. Negatively inclined slots in the frame allow the trailer to rotate about the axle free from interference from the yoke. The trailer is returned to its normal horizontal position by forward motion of the yoke with respect to the trailer frame.

It is therefore an object of the present invention to provide a tilting trailer which may rotate about one axle such that one end of the trailer rests on the ground.

It is a further object of the invention to provide a tilting trailer without the use of expensive and complicated hydraulic machinery. Other and more detailed objects of the invention will become apparent upon examination of the drawings and description contained herein.

DESCRIPTION OF THE INVENTION

Figure 1:
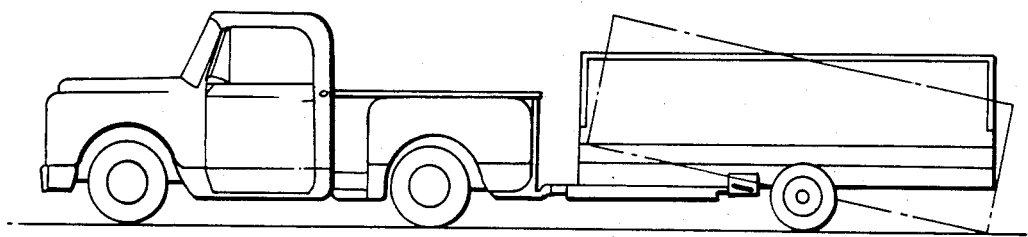
FIG. 1 is a side view of the invention connected to a pickup truck with the invention in its tilted position shown in phantom.
Figure 3:
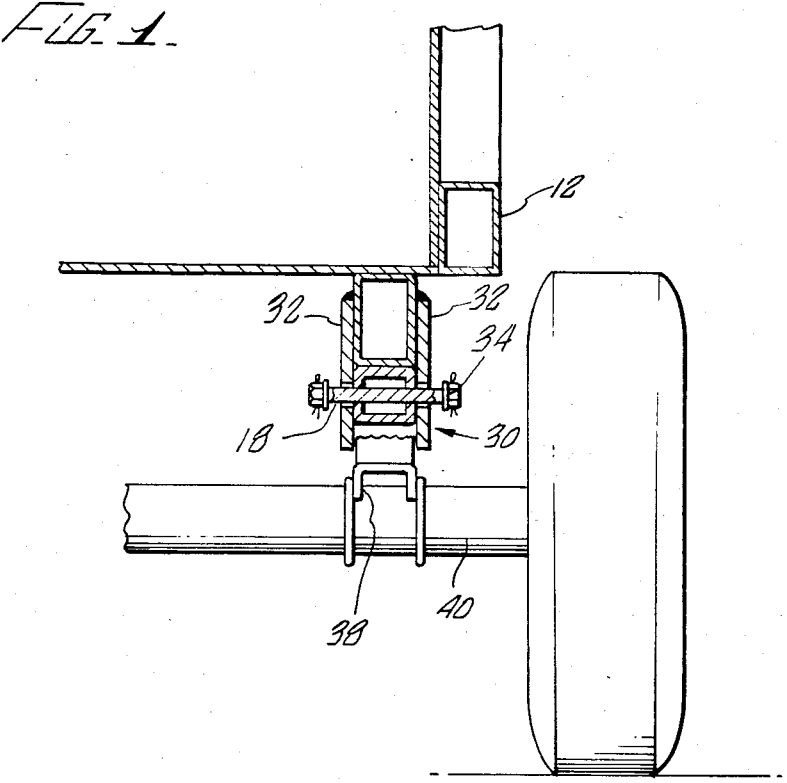
FIG. 3 is a cross-sectional view taken substantially along line 3—3 of FIG. 2.
Figure 4:
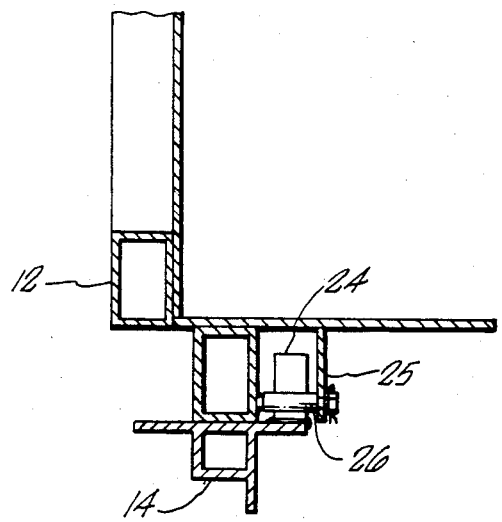
FIG. 4 is a cross-sectional view taken substantially along line 4—4 of FIG. 2.
Figure 2:
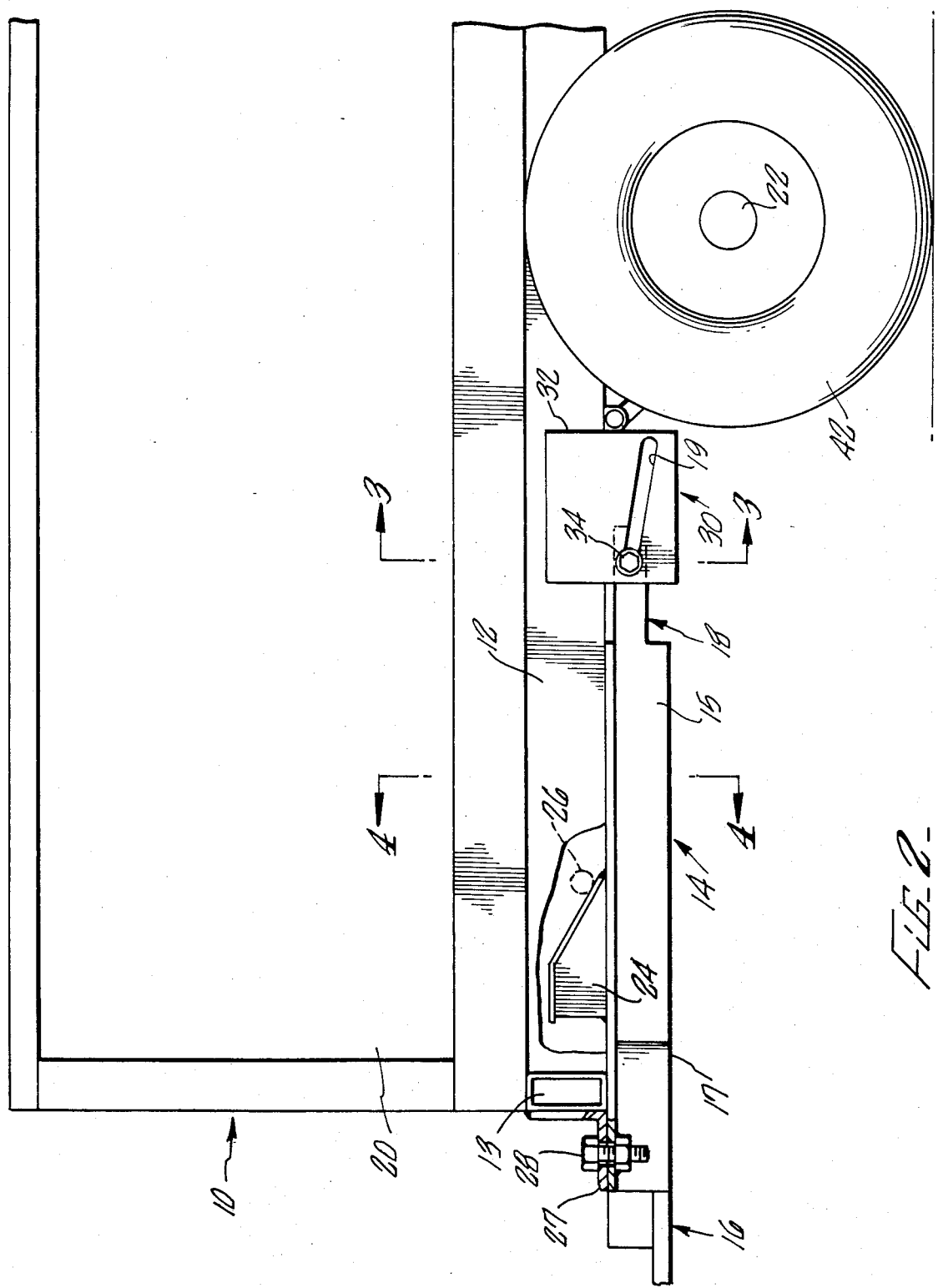
FIG. 2 is a side view of the relevant portion of the trailer.

A preferred embodiment of the invention will be described hereunder in detail with reference with the accompanying drawings. It is contemplated that the most common embodiment of the invention will be a trailer with walls extending above the trailer sides and therefore it is described in connection with such an embodiment but without limitation to its scope of uses beyond those contained within the appended claims.

As shown in the figures, the trailer 10 is defined for purposes of reference as having a front and rear end and two sides 20. In addition, the trailer 10 has an underbody frame including longitudinal members 12 and transverse members 13. A slidable yoke 14 fits about the front of the trailer 10. The yoke 14 has two longitudinal members 15 which are aligned parallel to the longitudinal trailer members 12. At a point 17 near the front of the trailer 10, a transverse stabilizing strut (not shown) is positioned between the parallel yoke members 15. Immediately thereafter, the parallel yoke members 15 converge towards a tongue member 16 at the front of the trailer 10, thereby forming a yoke 14.

An enclosure 30 is attached to each side 20 of the trailer 10. Each enclosure 30 has a pair of parallel side plates 32. Negatively inclined slots 19 are formed longitudinally along each enclosure side plate 32. A roller bearing 34 slidably connects the notched end 18 of the longitudinal yoke members 15 to the slots 19 in the enclosure side plates 32.

An inclined ramp 24 is formed on each of the longitudinal yoke members 15 near the front of the trailer 10. A roller 26 is fixedly secured to the longitudinal frame member 12 of the trailer 10 and a plate 25.

Pivoting means 38 pivotally connect the longitudinal members 12 of the trailer 10 to the rear axle 40.

A securing plate 27 is attached to the transverse member 13 of the trailer 10 so as to align with the transverse member 16 of the yoke 14. A cap screw 28 is used to secure the trailer 10 in its normal horizontal position.

Having fully described the invention its operation will be discussed hereinafter. Upon securing the wheels 42 of the trailer 10, and removing the cap screw 28 from the securing plate 27, a rearward force placed on the yoke 14 will act to rotate the trailer 10 about the rear axle 40. This is accomplished by the upward force of the inclined ramp 24 and the roller 26. In addition, an increasing vertical force is applied by the roller bearing 34 in the notched end 18 of the longitudinal members 15 of the yoke 14 to the parallel side plates 32. This vertical force increases as the yoke 14 slides rearward relative to the trailer 10. This action is continued until the trailer 10 is tilted to a sufficient degree such that rear of the trailer is in contact with the ground.

In order to restore the trailer 10 to its normal horizontal position, a forward force applied to the yoke 14 acts to apply a downward force on the enclosure side plates 32 due to the roller bearing 34. When the trailer 10 is restored to its normal horizontal position, the cap screw 28 is used to secure the securing plate 27 to the transverse member 16 of the yoke.

We claim:

1. A self-dumping trailer with a longitudinal direction, two ends, two sides, an axle in the transverse direction, a frame pivotally connected to the axle and a hitch, comprising, an enclosure including two side plates, one said enclosure on each side of the trailer, a negatively inclined slot formed in said slide plates of said enclosures, a slidable yoke, said yoke including two longitudinal members and a transverse member fixedly connected to said longitudinal members, means for slidably connecting said yoke longitudinal members to said slots in said enclosures, at least one inclined ramp formed on at least one of said longitudinal yoke members, a roller fixedly connected to the trailer frame, and means for attaching the trailer frame to said lateral yoke member, said yoke being slidable from a position forward in said slot to a position rearward in said slot, said roller being positioned to engage said ramp as said yoke slides in said slot and said slot being angled such that the trailer frame rotates free from interference from said yoke.

2. A trailer with two sides, a front, a back, an underside, an axle, a pivotally mounted frame and a hitch, comprising a slidable longitudinally extending yoke with two parallel members, one said member positioned parallel to each side of the trailer and running perpendicular to the axle, an enclosure on each side of the trailer, said enclosure including two longitudinal plates, an inclined slot, said slot being formed in the two longitudinal plates on each said enclosure, said slot be negatively inclined relative to the horizontal, means to slidably attach one said yoke member to said slots through each said enclosure on each side of the trailer, said yoke being slidable from a position forward in said slot to a position rearward in said slot, at least one transverse bar connected to said yoke, at least one inclined ramp attached to said yoke, at least one roller connected to said trailer frame, said ramp and said roller being arranged so that said roller rolls up said ramp and the trailer frame rotates as said yoke slides rearwardly in said slot, said slot being angled such that the trailer frame rotates free from interference from said yoke, and means to attach the front of the trailer frame to said transverse bar.

3. A trailer comprising, a frame having a negatively inclined slot therein, a yoke including at least one longitudinal member, said yoke being slidably attached to said frame slot, at least one inclined ramp connected to said yoke, a roller connected to said trailer frame, said ramp and said roller being arranged so as to cause rotational motion of said trailer frame when said yoke moves relative to said trailer frame, said slot being angled so that said trailer frame rotates free from interference from said yoke, and means to secure said trailer frame to said yoke.

4. A trailer for towing behind a vehicle comprising, a rotatable frame having a negatively inclined slot therein, a yoke slidably attached to said frame slot, an inclined ramp connected to said yoke, a roller connected to said frame and positioned for engagement with said ramp, said ramp being configured to rotate said frame during yoke sliding, and said slot being angled to permit frame rotation free from interference from said yoke.

* * * * *